No. 797,313. PATENTED AUG. 15, 1905.
M. P. OSBOURN.
FILTER AND PURIFIER FOR FEED WATER.
APPLICATION FILED AUG. 1, 1903.
2 SHEETS—SHEET 1.
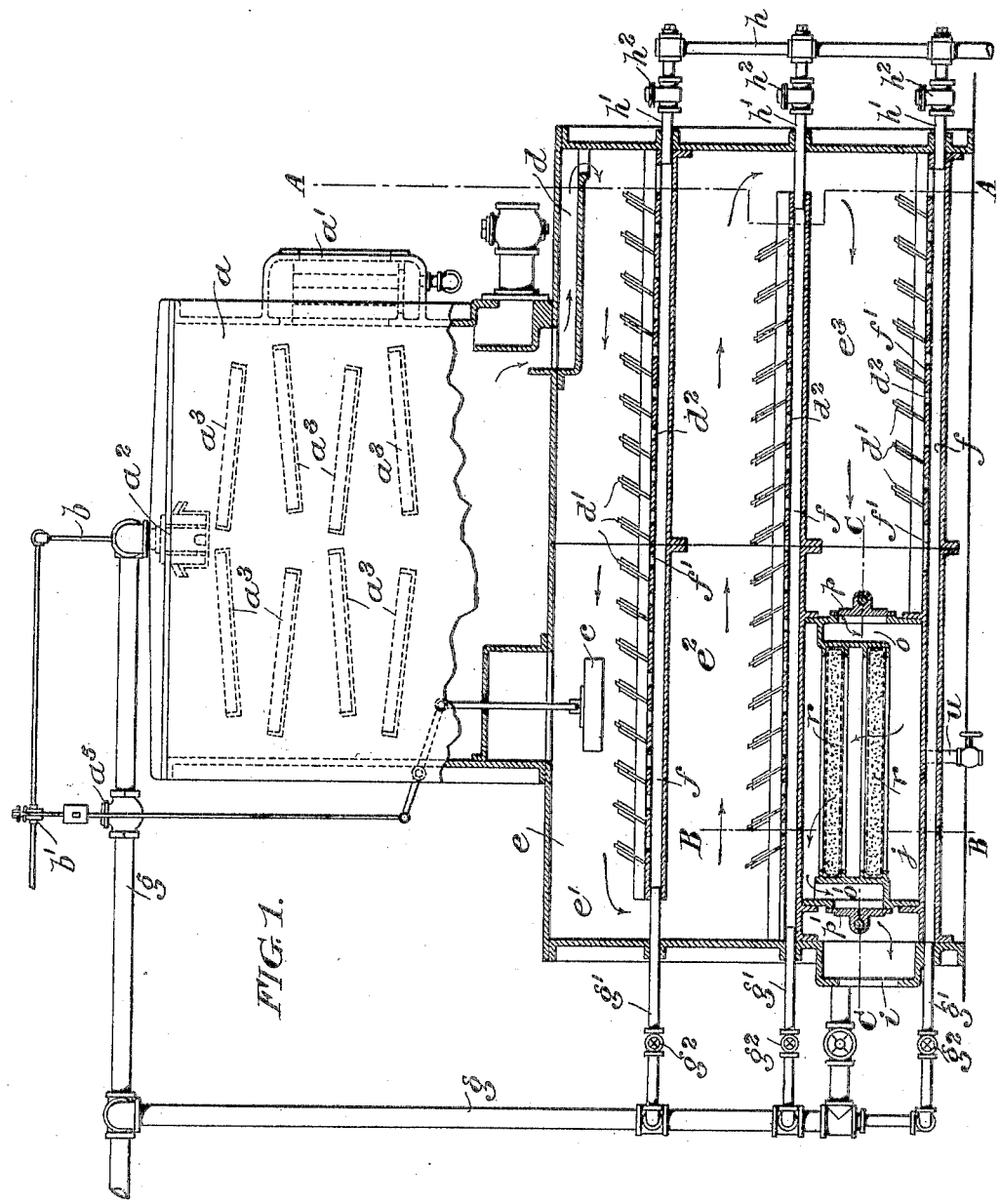
FIG. 1.
WITNESSES:
INVENTOR
Millard P. Osbourn
BY
ATTORNEY.

No. 797,313. PATENTED AUG. 15, 1905.
M. P. OSBOURN.
FILTER AND PURIFIER FOR FEED WATER.
APPLICATION FILED AUG. 1, 1903.
2 SHEETS—SHEET 2.
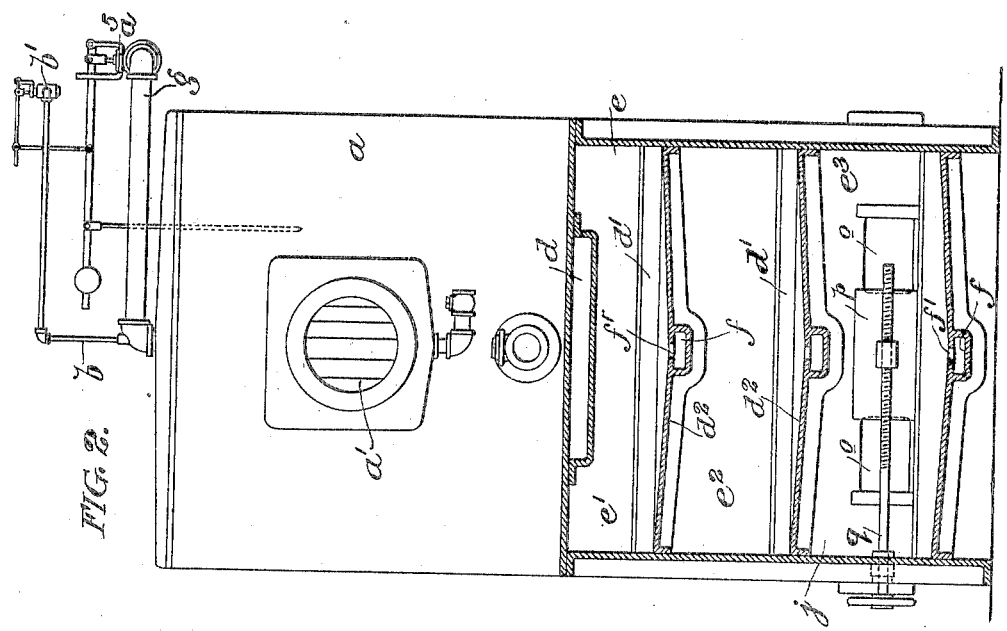
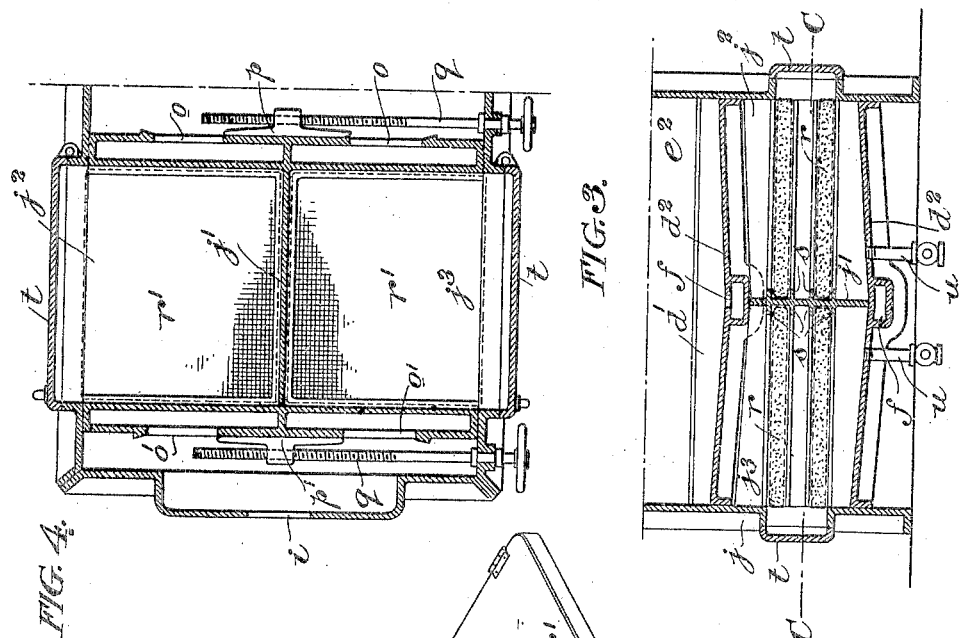
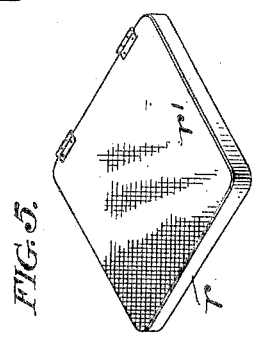

UNITED STATES PATENT OFFICE.

MILLARD P. OSBOURN, OF MERCHANTVILLE, NEW JERSEY, ASSIGNOR TO WARREN WEBSTER AND COMPANY, A CORPORATION OF NEW JERSEY.

FILTER AND PURIFIER FOR FEED-WATER.

No. 797,313.	Specification of Letters Patent.	Patented Aug. 15, 1905.

Application filed August 1, 1903. Serial No. 167,811.

*To all whom it may concern:*

Be it known that I, MILLARD P. OSBOURN, of Merchantville, Camden county, State of New Jersey, have invented an Improvement in Filters and Purifiers for Feed-Water, of which the following is a specification.

My invention relates particularly to devices for purifying and filtering feed-water. One of the great difficulties in such devices is the necessity of interrupting the operation of the filter while the filtering material is being cleaned or renovated, which frequently causes the suspension of the operation of an entire plant. My improvements are intended to entirely obviate this difficulty and to enable the filtering material to be removed and replaced from one portion of the filter while the other portion remains in action. This object I accomplish by forming the filter with independent filtering-chambers, each having an independent inlet and outlet, which may be closed independently of the inlet and outlet of the other chamber, and by providing the filtering-chamber with filtering appliances of a character which permits them to be easily removed and replaced through doors provided for that purpose. With my improvements in order to entirely renovate the filter it is only necessary to close one filtering-compartment, drain the contents, open the door, remove the filtering appliances and replace them by fresh ones, then open this filtering-chamber to the water and close the other and proceed in like manner with it. These operations may all be performed in a few minutes, and as one chamber is always in action there is no suspension of the operation of the filter.

My invention also embraces other improvements, which are fully set forth hereinafter.

In the drawings, Figure 1 is a longitudinal vertical sectional view of a feed-water heater, filter, and purifier embodying my improvements. Fig. 2 is a transverse vertical sectional view on the line A A of Fig. 1. Fig. 3 is a similar view on the line B B of Fig. 1. Fig. 4 is a horizontal sectional view on the line C C of Fig. 3, and Fig. 5 is a perspective view of one of the removable filter-sections.

The upper portion $a$ is the usual feed-water heater, which when used may be of the form shown or of any other suitable construction. As shown, the heater is of the "open" type, the steam being supplied through the steam-inlet $a'$ and the water through the inlet $a^2$. The water passes over the perforated pans $a^3$ and falls in a spray through the steam, which it condenses. A chemical purifying agent is supplied to the water-supply pipe $g$ from a pipe $b$, and the supply of both the water and purifying agent is controlled automatically by valves $a^5 b'$, operated by a float $c$, which may be either in the heater proper or, as here shown, in the purifier.

The hot water from the heater $a$ passes through the passage $d$ into the purifier $e$, which contains a number of chambers $e'$, $e^2$, and $e^3$, communicating with one another in series, through which the water passes over barriers $d'$ to a filter $j$ and after traversing the filter passes to the outlet $i$. The barriers $d'$ are arranged transversely above pans $d^2$, which catch the sediment and collect it in troughs or passages which discharge into pipes $h$.

A heater, filter, and purifier of this general character is shown and described in Letters Patent No. 729,088. A part of my improvements relate to a purifier of this character, while other improvements relate to the filter and are not limited to the particular character of the purifier shown. In Patent No. 729,088 the pans over which the barriers are arranged and by which the sediment is received and collected are each provided with a central open trough, from which discharge-pipes lead laterally through the side of the purifier.

In the present invention instead of having these open troughs each pan is formed with a longitudinal central passage-way or conduit $f$ below its upper surface, having perforations $f'$ for the passage of the sediment. These passage-ways or conduits $f$ are connected at one end to branch supply-pipes $g'$ for water or steam and at the other end with branches $h'$ of a discharge-main $h$. With this construction the sediment deposited in the passage-ways or conduits may be forced out through the discharge-pipes $h'$ into the main $h$ by water or steam introduced through the pipes $g'$. In the construction shown the branches $g'$ lead from the water-supply pipe $g$. Not only is this arrangement simpler in construction, but it enables the sediment to be more easily and quickly discharged through the straightway passages thus afforded, and as the passage-ways $f$ are closed except for the perforations $f'$ sufficient pressure may be utilized to effectively force out the sediment without unduly disturbing the dead-water held in the pockets formed between adjacent barriers $d'$. The inlet-pipes $g'$ and the discharge branches $h'$ are controlled by suitable valves $g^2 h^2$, respectively.

The filtering-chamber $j$ is interposed between the outlet $i$ and the last of the series of purifying-chambers, with which it communicates through suitable openings $o$. In the preferred form of my invention the filtering-chamber is of duplex form—i. e., it is divided vertically by a partition $j'$ into similar filtering-chambers $j^2 j^3$, each communicating with the purifier by an independent inlet $o$ and with the discharge by an independent outlet $o'$, so that either or both filtering-chambers may be used. These inlets and outlets are respectively controlled by doors or gates $p\,p'$, so arranged that either or both filtering-chambers may be open. In the construction shown these doors $p\,p'$ are of the sliding type, and each one is provided with a threaded boss engaging a screw $q$, extending through the side walls. By turning the screws $q$ the doors $p\,p'$ may be moved in either direction. When the doors $p\,p'$ are in the central position, as shown in Figs. 2 and 4, both filtering-chambers are open, and by moving the doors in one direction or the other one of the filtering-chambers may be closed.

Any suitable filtering appliances may be used in the filtering-chambers. I have, however, devised special filtering appliances which I prefer to use in practice. These consist of one or more removable cartridges placed horizontally in each filtering-chamber and adapted to be removed when necessary for cleaning or substitution. These cartridges preferably consist of flat boxes $r$, of gauze-wire, Fig. 5, having a lid $r'$. The filtering material (crushed quartz, charcoal, mineral wool, or whatever may be used) inclosed in a textile covering when necessary is packed in the box $r$, and the box is placed horizontally in the filtering-chamber.

In the construction shown the inner walls of the filtering-chambers are provided with horizontal guides $s\,s$, between which the cartridges are inserted. The side walls of the filtering-chambers are provided with doors $t\,t$ to enable the filtering-cartridges to be inserted or removed. In the drawings I have shown each filtering-chamber provided with two parallel filtering-cartridges, but one or any number may be used.

The operation of the filter is as follows: Supposing both filtering-chambers to be open, as shown in Figs. 2 and 4, which would be the normal operation, the water enters the lower portion of each filtering-chamber, passes upward through the filtering-cartridges, and then out through the outlets $o'\,o'$ to the discharge-outlet $i$. If for any reason it is desired to clean or renew the filtering material, the doors $p\,p'$ are moved to close one of the chambers $j^2\,j^3$, (the other remaining open.) The water contained in the closed filter is drained off through the outlet $u$, the door $t$ is opened, and the cartridge $r$ is removed. Meanwhile the passage of the water through the other filtering-chamber is not interrupted. After the cartridge is replaced in the first chamber and the door is closed the doors $p\,p'$ are moved back to open the inlet and outlet $o\,o'$. The other filtering-chamber may then be closed and its cartridge removed and replaced in like manner. The filterial material may thus be removed and replaced at any time without interrupting the operation of the filter.

The details of construction shown may be varied without departing from my invention.

What I claim as new, and desire to secure by Letters Patent, is as follows:

1. The combination in the purifying-chamber, of the outer casing divided longitudinally into horizontal compartments arranged one above another and communicating in series, the bases of said compartments consisting of horizontal pans provided with longitudinal central trough-like passage-ways opening at their ends and communicating with the faces of the pans through perforations therein, barriers extending transversely over the faces of said pans, a supply-pipe communicating with one end of each trough-like passage-way, and a discharge-pipe communicating with the other end.

2. In a filter and purifier, the combination of an outer casing, a purifying-chamber therein, a filter also located within the outer casing and having two separate filtering-chambers, provided with independent inlets communicating with the common purifying-chamber and with independent outlets, and means operated from the exterior of the casing to close the inlet and outlet of either filtering-chamber.

3. In a filter and purifier, the combination of an outer casing, a purifying-chamber therein, a filter also located within the outer casing and having two separate filtering-chambers, provided with independent inlets communicating with the common purifying-chamber and with independent outlets, movable doors adapted to close the inlet and outlet of either filtering-chamber, and means to operate said doors from the exterior of the outer casing.

4. In a filter and purifier, the combination of an outer casing, a purifying-chamber therein, a filter also within the outer casing and having two separate filtering-chambers provided with independent inlets communicating with the common purifying-chamber and with independent outlets, horizontal supports within the filtering-chambers, removable filtering appliances carried by said supports, said outer casing being provided with openings for the insertion and removal of said filtering appliances, doors for said openings and means operated from the exterior of the casing to control the inlets and outlets of the filtering-chambers.

5. In a filter, the combination of the body divided internally into two independent filtering-chambers each having an independent inlet and outlet, a sliding door centrally arranged between the pair of inlets and outlets respectively, and screws engaging said doors and adapted to move them transversely in either direction to close the inlet and outlet of either chamber.

6. A filter and purifier consisting of an outer shell or casing divided internally into a purifying-chamber and independent filtering-chambers having independent inlets from said purifying-chamber and independent outlets and each provided with an opening in the casing for the insertion and removal of the filtering appliance, doors to control said openings, means to control the inlets and outlets of said filtering-chambers, and a removable filtering appliance adapted to be inserted and removed from each filtering-chamber.

7. The combination in the purifying-chamber of the outer casing, a base-pan supported longitudinally in said casing and having an integral central longitudinal trough-like passage-way open at its ends and communicating with the face of the base-pan through perforations therein, transverse barriers extending across the face of the base-pan, a supply-pipe communicating with one end of said trough-like passage-way, and a discharge-pipe communicating with the other end thereof, said trough and supply and discharge pipes forming a straightway passage for blowing out sediment.

In testimony of which invention I hereunto set my hand.

MILLARD P. OSBOURN.

Witnesses:
MAX P. MILLER,
FRANK R. BOWNE.